(12) United States Patent
Nakamura et al.

(10) Patent No.: US 11,788,909 B2
(45) Date of Patent: Oct. 17, 2023

(54) MEASURING DEVICE AND MEASURING METHOD USING TAPE CORE WIRE

(71) Applicant: NIPPON TELEGRAPH AND TELEPHONE CORPORATION, Tokyo (JP)

(72) Inventors: Atsushi Nakamura, Musashino (JP); Daisuke Iida, Musashino (JP); Hiroyuki Oshida, Musashino (JP); Tatsuya Okamoto, Musashino (JP); Tomokazu Oda, Musashino (JP); Yoshifumi Wakisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/798,172

(22) PCT Filed: Mar. 5, 2020

(86) PCT No.: PCT/JP2020/009515
§ 371 (c)(1),
(2) Date: Aug. 8, 2022

(87) PCT Pub. No.: WO2021/176667
PCT Pub. Date: Sep. 10, 2021

(65) Prior Publication Data
US 2023/0152170 A1 May 18, 2023

(51) Int. Cl.
*G01L 1/24* (2006.01)
*G01L 5/00* (2006.01)

(52) U.S. Cl.
CPC ............ *G01L 1/242* (2013.01); *G01L 5/0042* (2013.01)

(58) Field of Classification Search
CPC ......... G01L 1/242; G01L 5/0042; G01L 3/00; G01B 11/16; G01D 5/26
See application file for complete search history.

(56) References Cited

U.S. PATENT DOCUMENTS 6,127,672 A * 10/2000 Danisch ................. G01B 11/18
600/595
7,781,724 B2 * 8/2010 Childers ............ A61B 1/00165
250/227.14

(Continued)

OTHER PUBLICATIONS

Jason P. Moore et al., "Shape sensing using multi-core fiber optic cable and parametric curve solutions", Optics Express, vol. 20, No. 3, (2012) pp. 2967-2973.

(Continued)

*Primary Examiner* — Freddie Kirkland, III
(74) *Attorney, Agent, or Firm* — Harness, Dickey & Pierce, P.L.C.

(57) ABSTRACT

An object of the present disclosure is to provide a method and an apparatus for acquiring curvature and torsion using an inexpensive sensor medium. Disclosed is a measurement apparatus including a fiber ribbon including a plurality of coated fibers arranged in parallel, a strain measurement unit that measures strain amounts of the plurality of coated fibers, and an arithmetic processing unit that calculates curvature and torsion of the fiber ribbon using a strain amount of a coated fiber arranged in a middle portion of the plurality of coated fibers and a strain amount of a coated fiber arranged in a marginal portion of the plurality of coated fibers.

4 Claims, 9 Drawing Sheets

(56) References Cited

U.S. PATENT DOCUMENTS

| | | | | |
|---|---|---|---|---|
| 8,746,076 | B2* | 6/2014 | Rogge | G01L 1/24 |
| | | | | 385/12 |
| 10,132,614 | B2* | 11/2018 | Froggatt | G01B 9/0209 |
| 10,545,283 | B2* | 1/2020 | Froggatt | G01D 5/3538 |
| 11,473,943 | B2* | 10/2022 | Horikx | G02B 6/02042 |
| 2013/0100440 | A1* | 4/2013 | Oyamada | G01B 11/255 |
| | | | | 356/73.1 |
| 2022/0364846 | A1* | 11/2022 | Iida | G01L 1/242 |

OTHER PUBLICATIONS

M.J. Gander et al., "Bend measurement using Bragg gratings in multicore fibre", Electronics letters, vol. 36, No. 2, (2000) pp. 120-121.

* cited by examiner

[3]

MEASURING DEVICE AND MEASURING METHOD USING TAPE CORE WIRE

CROSS-REFERENCE TO RELATED APPLICATIONS

This application is a 371 U.S. National Phase of International Application No. PCT/JP2020/009515, filed on Mar. 5, 2020. The entire disclosure of the above application is incorporated herein by reference.

TECHNICAL FIELD

The present disclosure relates to a measurement apparatus and a measurement method for measuring curvature and torsion.

BACKGROUND ART

Shape sensing using optical fibers has attracted attention. Curvature and torsion applied to an optical fiber are acquired for analysis of the shape (trajectory) of the optical fiber.

There has been proposed a technique using a multicore optical fiber with Fiber Bragg Gratings (FBG) in which the wavelength of reflected light is changed (Bragg wavelength is shifted) by fiber bending, measuring the longitudinal strain distribution of each core by Optical Frequency Domain Reflectometry (OFDR) or the like, and then calculating curvature and torsion based on a cross-sectional strain distribution obtained from the strain of each core at an identical point (see NPLs 1 and 2, for example).

CITATION LIST

Non Patent Literature

NPL 1: "Shape sensing using multi-core fiber optic cable and parametric curve solutions", Optics Express, Vol. 20, No. 3, pp. 2967-2973

NPL 2: "Bend measurement using Bragg gratings in multi-core fibre", Electronics letters, vol. 36, no. 2, pp. 120-121

SUMMARY OF THE INVENTION

Technical Problem

Because special optical fibers such as a FBG multicore optical fiber are very expensive, there is a need for a method and an apparatus for acquiring curvature and torsion using a less expensive sensor medium. Thus, an object of the present disclosure is to provide a method and an apparatus for acquiring curvature and torsion using an inexpensive sensor medium.

Means for Solving the Problem

To achieve the above object, the present disclosure uses a fiber ribbon as a sensor medium for shape sensing using optical fibers, measures the longitudinal strain distribution of each coated fiber using a reflection measuring method such as Brillouin Optical Time Domain Reflectometry (B-OTDR) or OFDR, and then acquires the curvature and the torsion of the fiber ribbon based on the difference in a strain amount between optical fibers in the inner portion and in the outer portion of the fiber ribbon.

Specifically, a measurement apparatus according to the present disclosure includes: a fiber ribbon including a plurality of coated fibers arranged in parallel; a strain measurement unit that measures strain amounts of the plurality of coated fibers; and an arithmetic processing unit that calculates curvature and torsion of the fiber ribbon using a strain amount of a coated fiber arranged in a middle portion of the plurality of coated fibers and a strain amount of a coated fiber arranged in a marginal portion of the plurality of coated fibers.

Specifically, a measurement method according to the present disclosure is performed by a measurement apparatus, the measurement apparatus being connected to a fiber ribbon including a plurality of coated fibers arranged in parallel, the measurement method including measuring, by the measurement apparatus, strain amounts of the plurality of coated fibers, and calculating, by the measurement apparatus, curvature and torsion of the fiber ribbon using a strain amount of a coated fiber arranged in a middle portion of the plurality of coated fibers and a strain amount of a coated fiber arranged in a marginal portion of the plurality of coated fibers.

Effects of the Invention

The present disclosure uses a general-purpose fiber ribbon as a sensor medium and thus enables reduction of the cost of shape sensing.

DESCRIPTION OF EMBODIMENTS

Hereinafter, embodiments of the present disclosure will be described in detail with reference to the drawings. Note that the present disclosure is not limited to the embodiments described below. These embodiments are just illustrative examples, and the present disclosure can be implemented in forms in which various modifications and improvements are added on the basis of knowledge of those skilled in the art. Note that constituent elements with the same reference signs in the specification and the drawings are assumed to be the same constituent elements.

Figure 1:
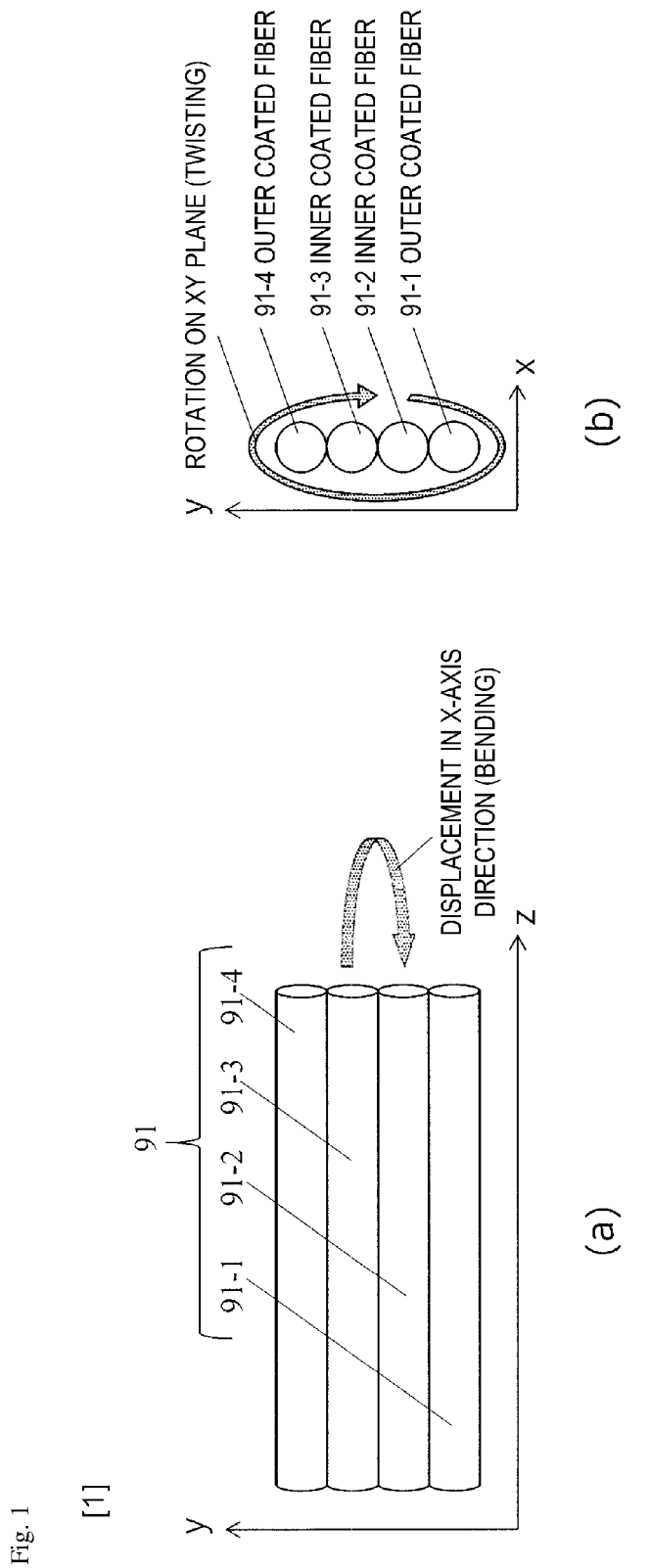
FIG. 1 illustrates an example of a fiber ribbon, where FIG. 1(*a*) is a side view and FIG. 1(*b*) is a cross-sectional view.

FIG. 1 illustrates an example of a fiber ribbon. In the fiber ribbon, a plurality of coated fibers 91-1 to 91-4, which are primary optical coated fibers, are arranged in parallel and coated with resin. FIG. 1 illustrates an example in which four coated fibers 91-1 to 91-4 are arranged. The coated fibers 91-1 to 91-4 are bonded together by a coating. For this reason, while strains imposed on the coated fibers 91-1 to 91-4 are equal to each other in a state of displacement (bending) in the x-axis direction, strains imposed on the coated fibers 91-1 and 91-4, disposed in an outer portion, are larger than strains imposed on the coated fibers 91-2 and 91-3, disposed in an inner portion, in a state of rotation (twisting) on the xy plane. Further, considering the rigidity of the fiber ribbon, it can be assumed that the fiber ribbon is not bent in the y-axis direction but is just bent or twisted in the x-axis direction.

Thus, in the present disclosure, the curvature and the torsion of a fiber ribbon 91 are calculated based on the analysis of increase in a strain amount imposed on each of the coated fibers 91-1 to 91-4 and the analysis of difference in a strain amount between the coated fibers 91-2 and 91-3 disposed in the inner portion and the coated fibers 91-1 and 91-4 disposed in the outer portion.

Embodiment 1

Figure 2:
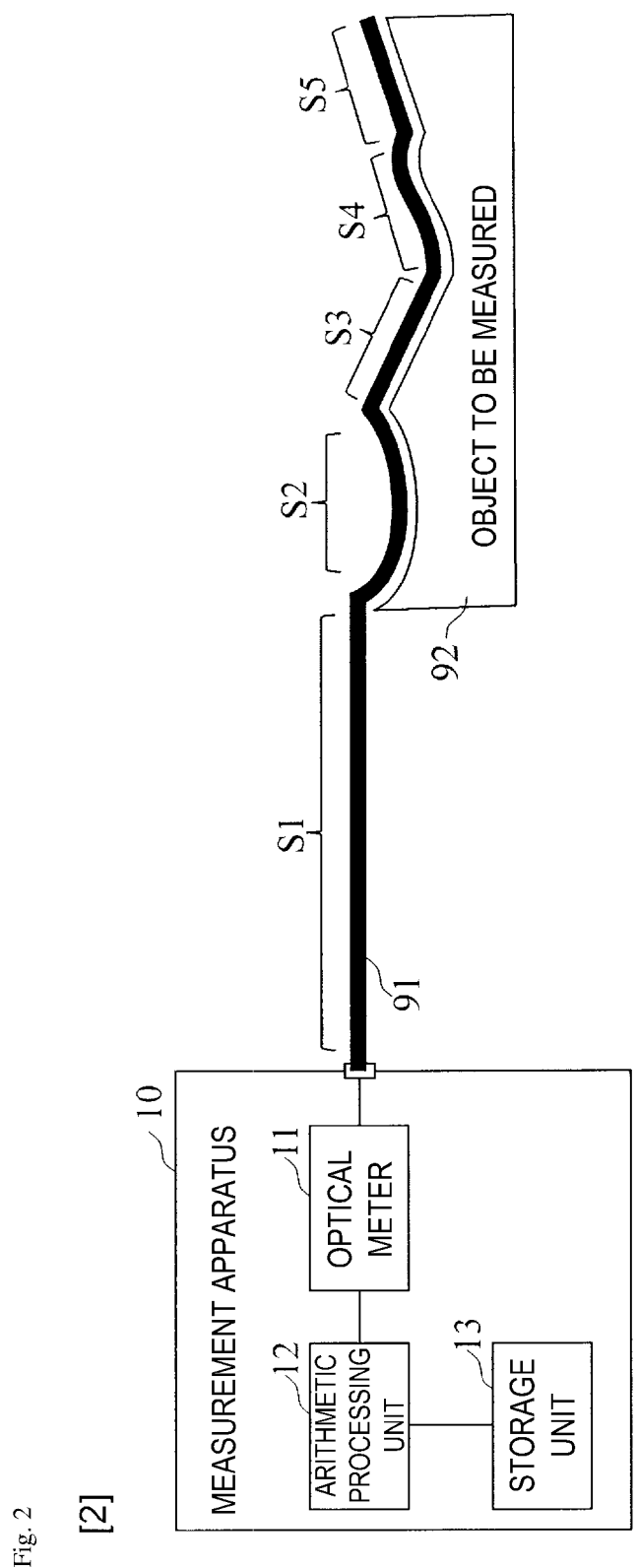
FIG. 2 illustrates an example of a system configuration according to the present disclosure.

FIG. 2 illustrates an example of a system configuration according to the present disclosure. A system according to the present disclosure includes a measurement apparatus 10 and a fiber ribbon 91. The fiber ribbon 91 is used as a sensor medium and is laid on an object to be measured 92 subjected to shape sensing. The fiber ribbon 91 can be a general-purpose fiber ribbon including four coated fibers arranged as illustrated in FIG. 1.

The measurement apparatus 10 includes an optical meter 11 which functions as a strain measurement unit, an arithmetic processing unit 12, and a storage unit 13. The measurement apparatus 10 can also be achieved by a computer and a program, and the program can be recorded on a recording medium or provided via a network.

The optical meter 11 measures the strain of each of the coated fibers 91-1 to 91-4 included in the fiber ribbon 91. The optical meter 11 is any optical meter capable of measuring the longitudinal strain distribution of optical fibers, for example, a Brillouin OTDR (B-OTDR) or an OFDR.

The arithmetic processing unit 12 measures the strain distribution of each of the coated fibers 91-1 to 91-4 using the strains measured by the optical meter 11, and calculates the curvature and the torsion of the fiber ribbon 91 by using the strain distribution.

The storage unit 13 stores a relationship between curvature and a strain amount that are preliminarily measured using the fiber ribbon 91 and a relationship between torsion and a strain amount that are measured in the same way.

Figure 3:
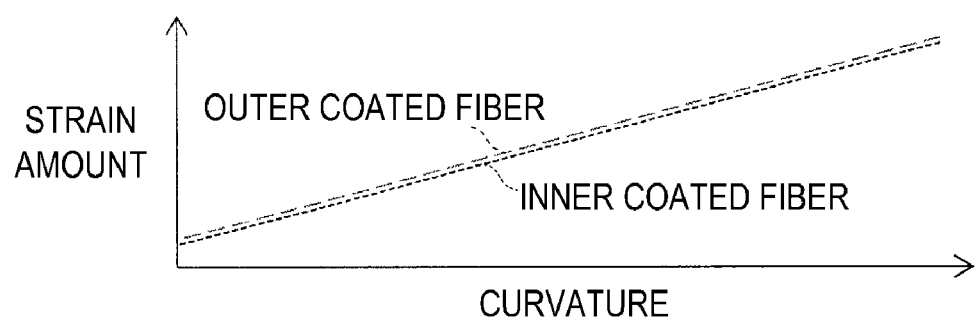
FIG. 3 illustrates an example of a relationship between curvature and a strain amount.

FIG. 3 illustrates an example of the relationship between the curvature and the strain amount of the fiber ribbon 91. When the curvature of the fiber ribbon 91 increases, both the strain amount of the coated fibers 91-2 and 91-3 in the inner portion and the strain amount of the coated fibers 91-1 and 91-4 in the outer portion increase in the same manner. Thus, when the strain amount of the coated fibers 91-2 and 91-3 in the inner portion is substantially equal to the strain amount of the coated fibers 91-1 and 91-4 in the outer portion, the arithmetic processing unit 12 can use a strain amount of at least any one of the coated fibers 91-1 to 91-4 and derive curvature corresponding to the strain amount.

Figure 4:
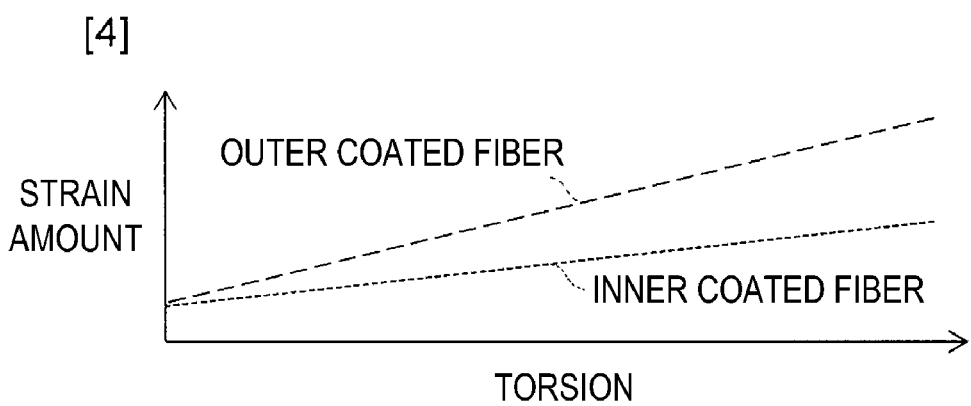
FIG. 4 illustrates an example of a relationship between torsion and a strain amount.

FIG. 4 illustrates an example of the relationship between torsion and a strain amount of the fiber ribbon 91. When the torsion increases, the strain amount of the coated fibers 91-1 and 91-4 in the outer portion becomes more than the strain amount of the coated fibers 91-2 and 91-3 in the inner portion. Thus, when the strain amount of the coated fibers 91-1 and 91-4 in the outer portion is more than the strain amount of the coated fibers 91-2 and 91-3 in the inner portion, the arithmetic processing unit 12 can use a strain amount of at least any one of the coated fibers 91-1 to 91-4 and derive torsion corresponding to the strain amount.

Figure 5:
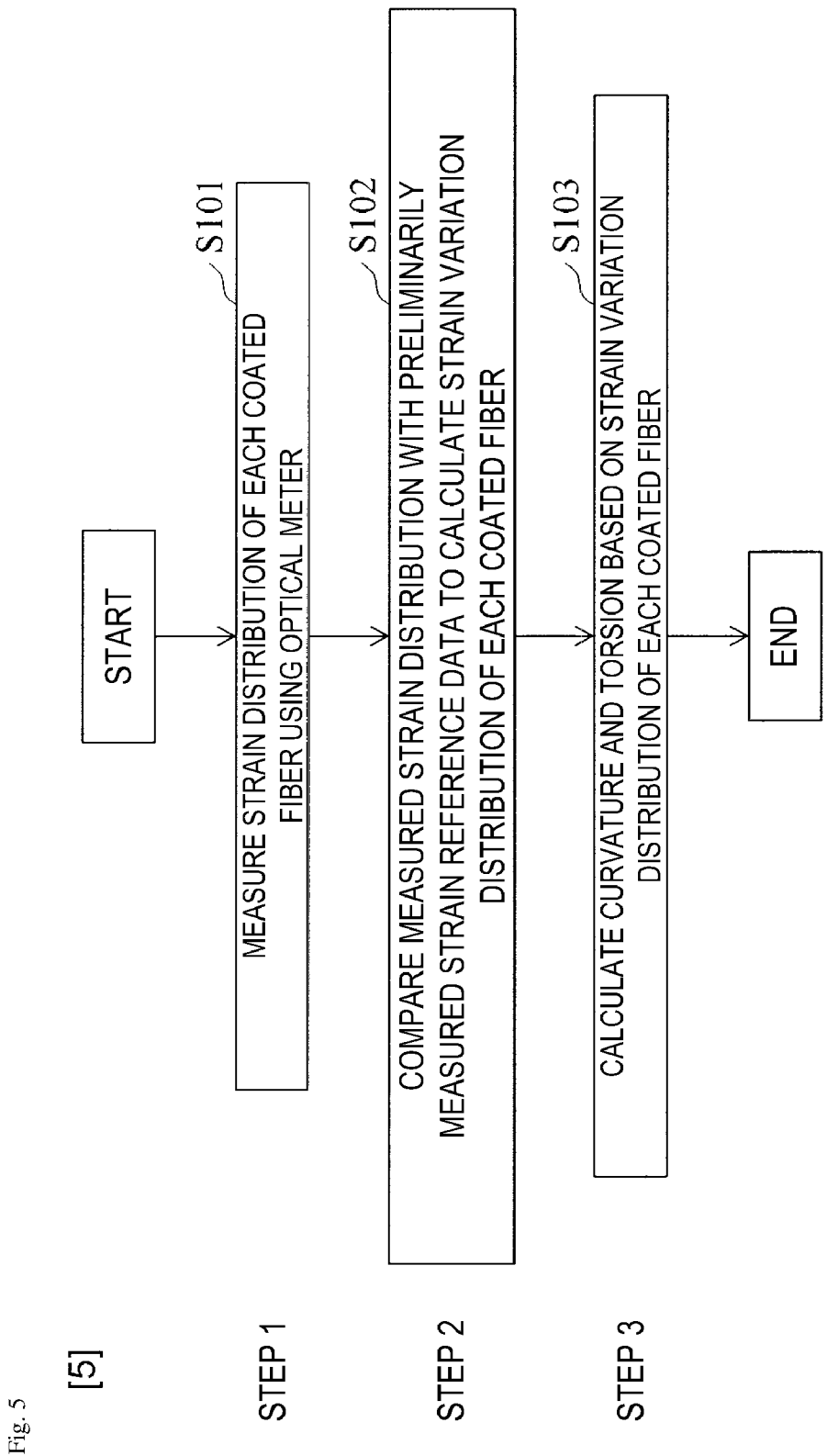
FIG. 5 illustrates an example of a flowchart of processing performed by a measurement apparatus according to the present disclosure.

FIG. 5 illustrates an example of a flowchart of processing performed by the measurement apparatus according to the present disclosure.

The measurement apparatus 10 performs steps S101 to S103.

S101: The optical meter 11 measures the strain distribution of each of the coated fibers 91-1 to 91-4.

S102: The arithmetic processing unit 12 compares the measured strain distribution with preliminarily measured reference strain data, and calculates the strain variation amount distribution of each of the coated fibers 91-1 to 91-4.

S103: The curvature and the torsion of the fiber ribbon 91 are calculated using the strain variation amount distribution of each of the coated fibers 91-1 to 91-4.

Figure 6:
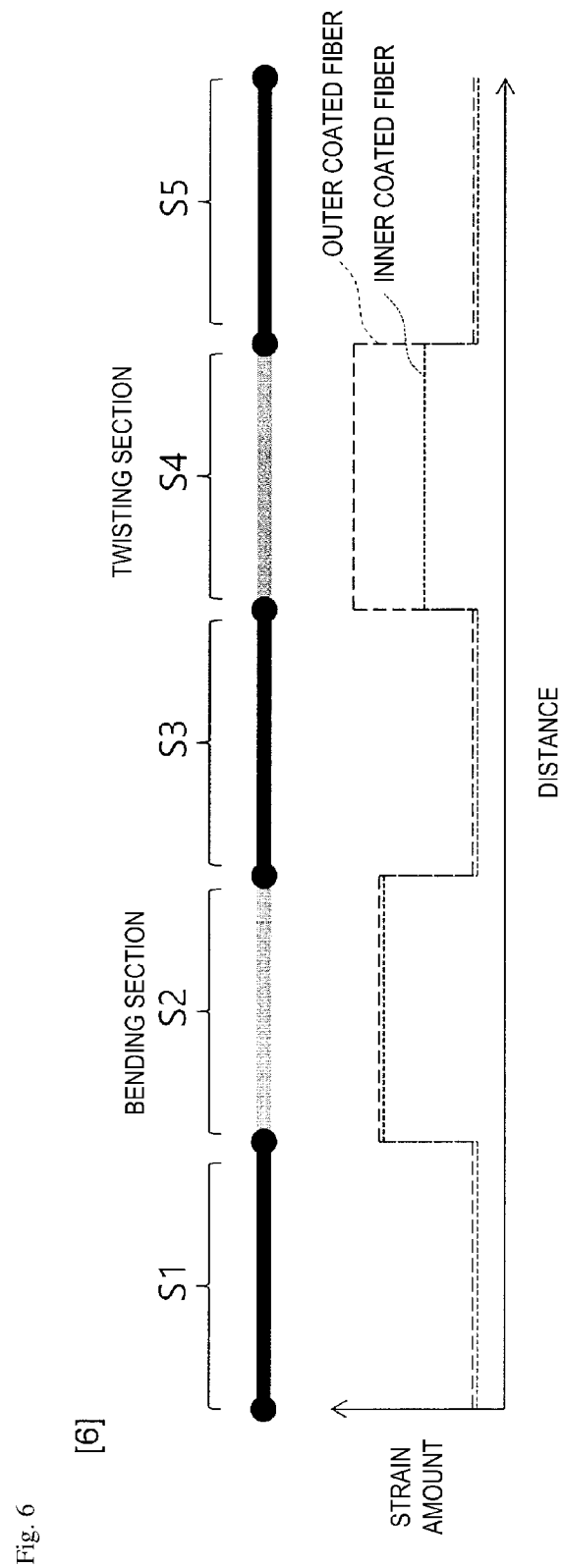
FIG. 6 illustrates an example of strain amount distribution measured in step S101.

FIG. 6 illustrates an example of the strain amount distribution measured in step S101. The optical meter 11 makes signal light incident on each of the coated fibers 91-1 to 91-4, and measures a strain amount at each distance from the optical meter 11 using return light from each of the coated fibers 91-1 to 91-4. This allows the arithmetic processing unit 12 to acquire the strain amount at each section S1 to S5.

In step S102, the arithmetic processing unit 12 calculates the strain variation amount distribution by subtracting the preliminarily measured reference strain distribution (distribution data without strain) from the strain distribution measured in step S101.

Figure 7:
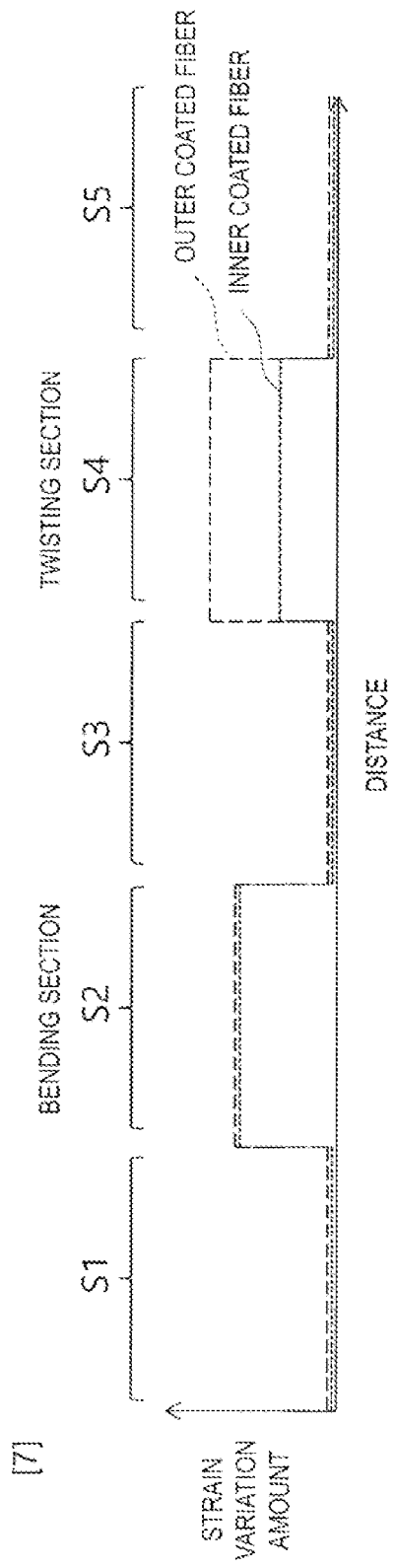
FIG. 7 illustrates an example of strain variation amount distribution.

FIG. 7 illustrates an example of strain variation amount distribution. In section S2, the strain amount of the coated fibers 91-2 and 91-3 in the inner portion is substantially equal to the strain amount of the coated fibers 91-1 and 91-4 in the outer portion. In section S4, the strain amount of the coated fibers 91-1 and 91-4 in the outer portion is more than the strain amount of the coated fibers 91-2 and 91-3 in the inner portion. There is no increase in the strain amount in sections S1, S3, and S5.

Figure 8:
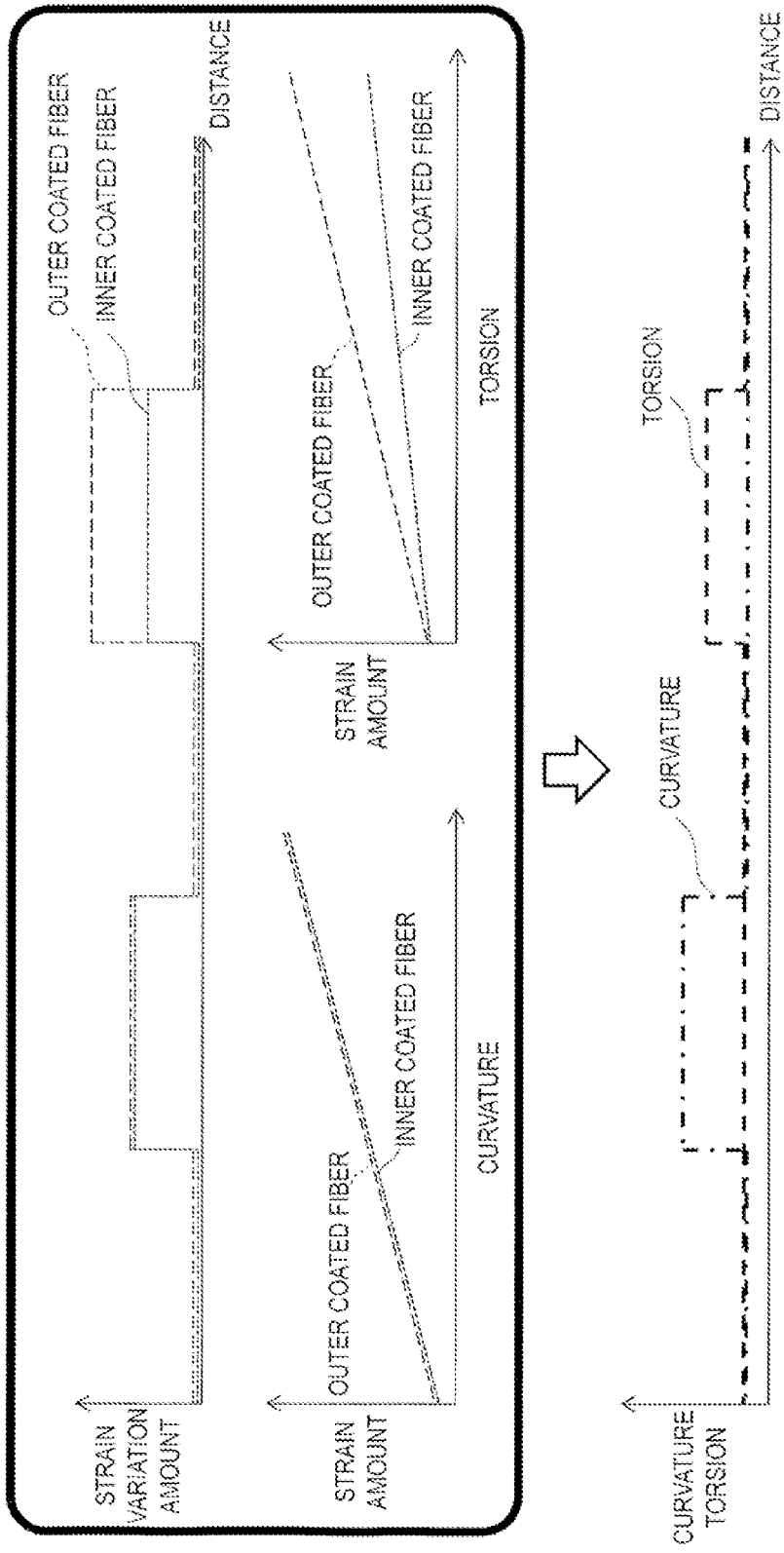
FIG. 8 illustrates an example of measurement of curvature and torsion at each point.

In step S103, the arithmetic processing unit 12 calculates the distributions of the curvature and the torsion of the fiber ribbon 91 at each point using "the strain variation amount" acquired in step S102 and "the relationship between the curvature and the strain amount" and "the relationship between the torsion and the strain amount" stored in the storage unit 13. For example, in section S2, the strain amount in the inner portion is substantially equal to the strain amount in the outer portion. Thus, the arithmetic processing unit 12 derives curvature corresponding to the strain amount using the relationship between the curvature and the strain amount as illustrated in FIG. 3. For example, in section S4, the strain amount in the inner portion is different from the strain amount in the outer portion. Thus, the arithmetic processing unit 12 derives torsion corresponding to the strain amount using the relationship between the torsion and the strain amount as illustrated in FIG. 4. This allows the measurement of curvature and torsion at each point from the optical meter 11 as illustrated in FIG. 8.

Embodiment 2

In the present embodiment, acquisition of twisting direction will be described. The present embodiment has a system configuration identical to Embodiment 1 and uses the optical meter 11 to measure longitudinal strain distribution of optical fibers. However, the fiber ribbon 91 is laid on the object to be measured 92 in a preliminarily twisted condition. Then, steps S101 to S103 are performed in the same manner as in Embodiment 1, but step S103 differs as described below.

Figure 9:
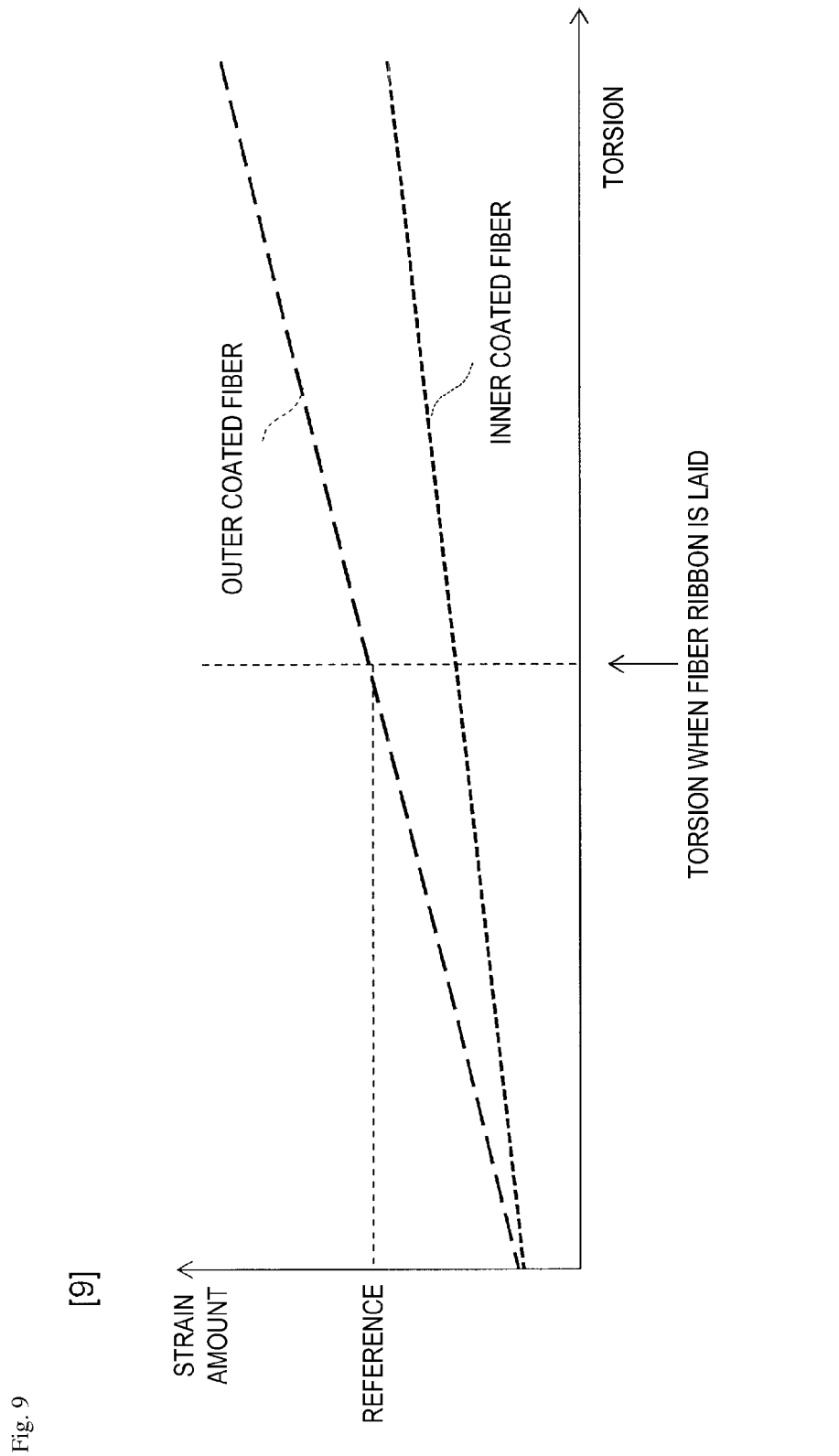
FIG. 9 illustrates an example of a relationship between torsion and a strain amount in Embodiment 2.

In the present embodiment, the fiber ribbon 91 is preliminarily twisted. For this reason, strain is preliminarily caused as illustrated in FIG. 9. Thus, when each strain amount increases from a reference thereof, the arithmetic processing unit 12 determines that twisting is added in a direction identical to a direction of the preliminary twisting. On the other hand, when each strain amount decreases from the reference, the arithmetic processing unit 12 determines that twisting is added in a direction opposite to the direction of the preliminary twisting. Note that the comparison between the reference and the strain amount may employ a difference in the preliminarily caused strain amount between the inner portion and the outer portion.

Points of the Invention

A general-purpose fiber ribbon is used as a sensor medium.

A longitudinal strain distribution of each coated fiber is measured by B-OTDR, OFDR, or the like.

The curvature and the torsion of the fiber ribbon are calculated based on a difference between strain amounts applied to optical fibers in the inner portion and in the outer portion of the fiber ribbon.

In consideration of the rigidity of the fiber ribbon, it is assumed that the fiber ribbon is not bent in a y-axis direction but is just bent or twisted in an x-axis direction.

Effects

Because a general-purpose fiber ribbon is used as a sensor medium, it is possible to provide a method and an apparatus each capable of acquiring curvature and torsion at a lower cost than a method that uses a special sensor medium such as a multicore fiber.

INDUSTRIAL APPLICABILITY

The present disclosure can be applied in the information communication industry.

REFERENCE SIGNS LIST

10: Measurement apparatus
11: Optical meter
12: Arithmetic processing unit
13: Storage unit
91: Fiber ribbon
91-1, 91-2, 91-3, 91-4: Coated fiber
92: Object to be measured

The invention claimed is:

1. A measurement apparatus comprising:
   a fiber ribbon including a plurality of coated fibers arranged in parallel;
   a strain measurement unit configured to measure strain amounts of the plurality of coated fibers; and
   an arithmetic processing unit configured to calculate curvature and torsion of the fiber ribbon using a strain amount of a coated fiber arranged in a middle portion of the plurality of coated fibers and a strain amount of a coated fiber arranged in a marginal portion of the plurality of coated fibers.

2. The measurement apparatus according to claim 1, further comprising
   a storage unit configured to store a relationship between curvature and a strain amount and a relationship between torsion and a strain amount, wherein
   when a variation in the strain amount of the coated fiber arranged in the middle portion of the plurality of coated fibers is substantially equal to a variation in the strain amount of the coated fiber arranged in the marginal portion of the plurality of coated fibers, the arithmetic processing unit derives curvature corresponding to the strain amounts measured by the strain measurement unit using the relationship between the curvature and the strain amount stored in the storage unit, and
   when the variation in the strain amount of the coated fiber arranged in the middle portion of the plurality of coated fibers is different from the variation in the strain amount of the coated fiber arranged in the marginal portion of the plurality of coated fibers, the arithmetic processing unit derives torsion corresponding to the strain amounts measured by the strain measurement unit using the relationship between the torsion and the strain amount stored in the storage unit.

3. The measurement apparatus according to claim 1, wherein
   the fiber ribbon is preliminarily twisted,
   the measurement apparatus further comprises a storage unit configured to store a relationship between torsion and a strain amount of the fiber ribbon and a reference value of strain caused by the preliminary twisting, and
   the arithmetic processing unit determines that twisting is added in a direction identical to a direction of the preliminary twisting of the fiber ribbon when the strain amounts of the plurality of coated fibers are each more than the reference value, and determines that twisting is added in a direction opposite to the direction of the preliminary twisting of the fiber ribbon when the strain amounts of the plurality of coated fibers are each less than the reference value.

4. A measurement method performed by a measurement apparatus, the measurement apparatus being connected to a fiber ribbon including a plurality of coated fibers arranged in parallel, the measurement method comprising:
   measuring, by the measurement apparatus, strain amounts of the plurality of coated fibers; and
   calculating, by the measurement apparatus, curvature and torsion of the fiber ribbon using a strain amount of a coated fiber arranged in a middle portion of the plurality of coated fibers and a strain amount of a coated fiber arranged in a marginal portion of the plurality of coated fibers.

\* \* \* \* \*